March 11, 1969  S. S. HARBAUGH  3,432,604
AUTOMATIC DETERMINATION OF ARC FURNACE OPERATING STATE
Filed Feb. 13, 1967  Sheet 1 of 4

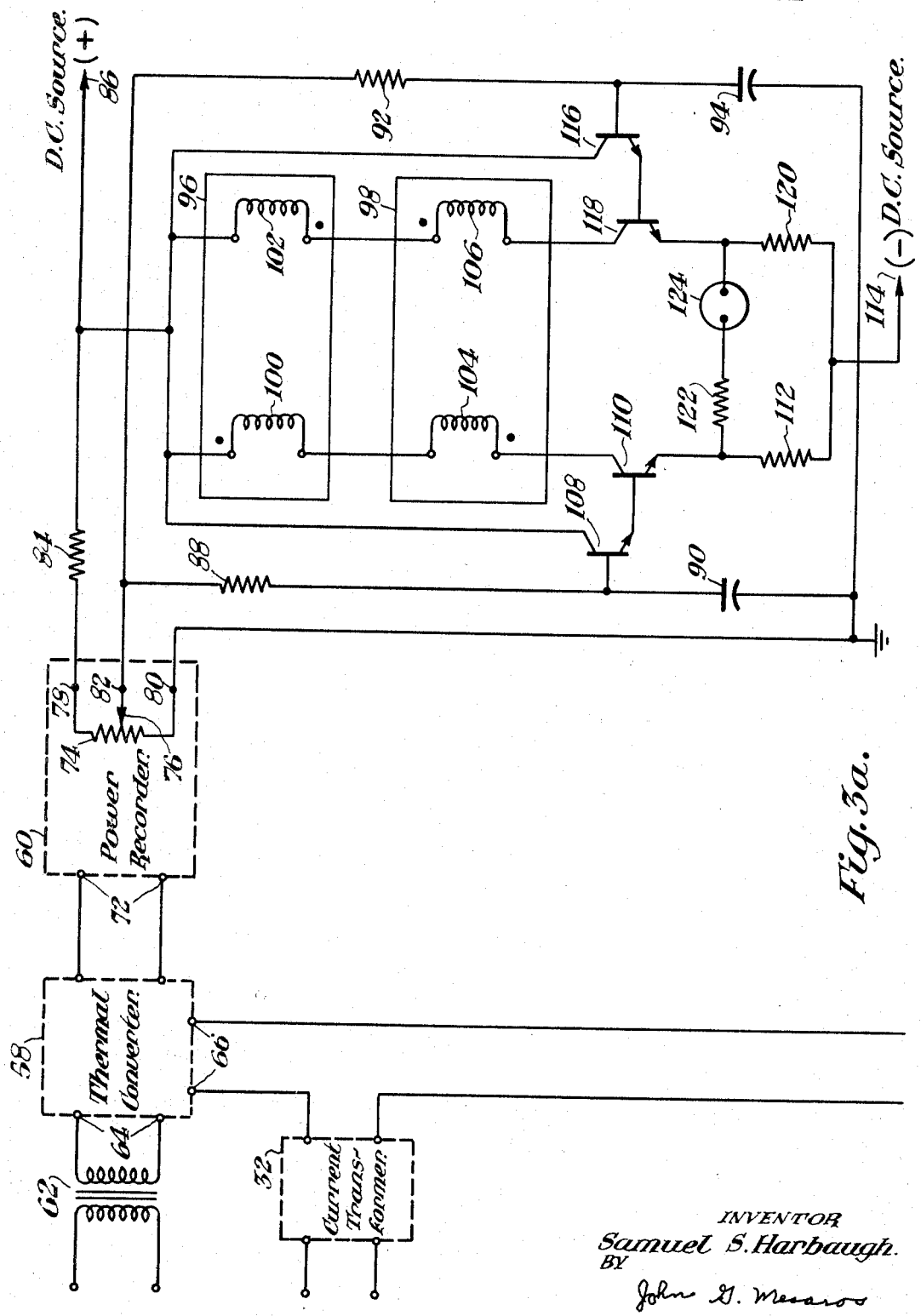

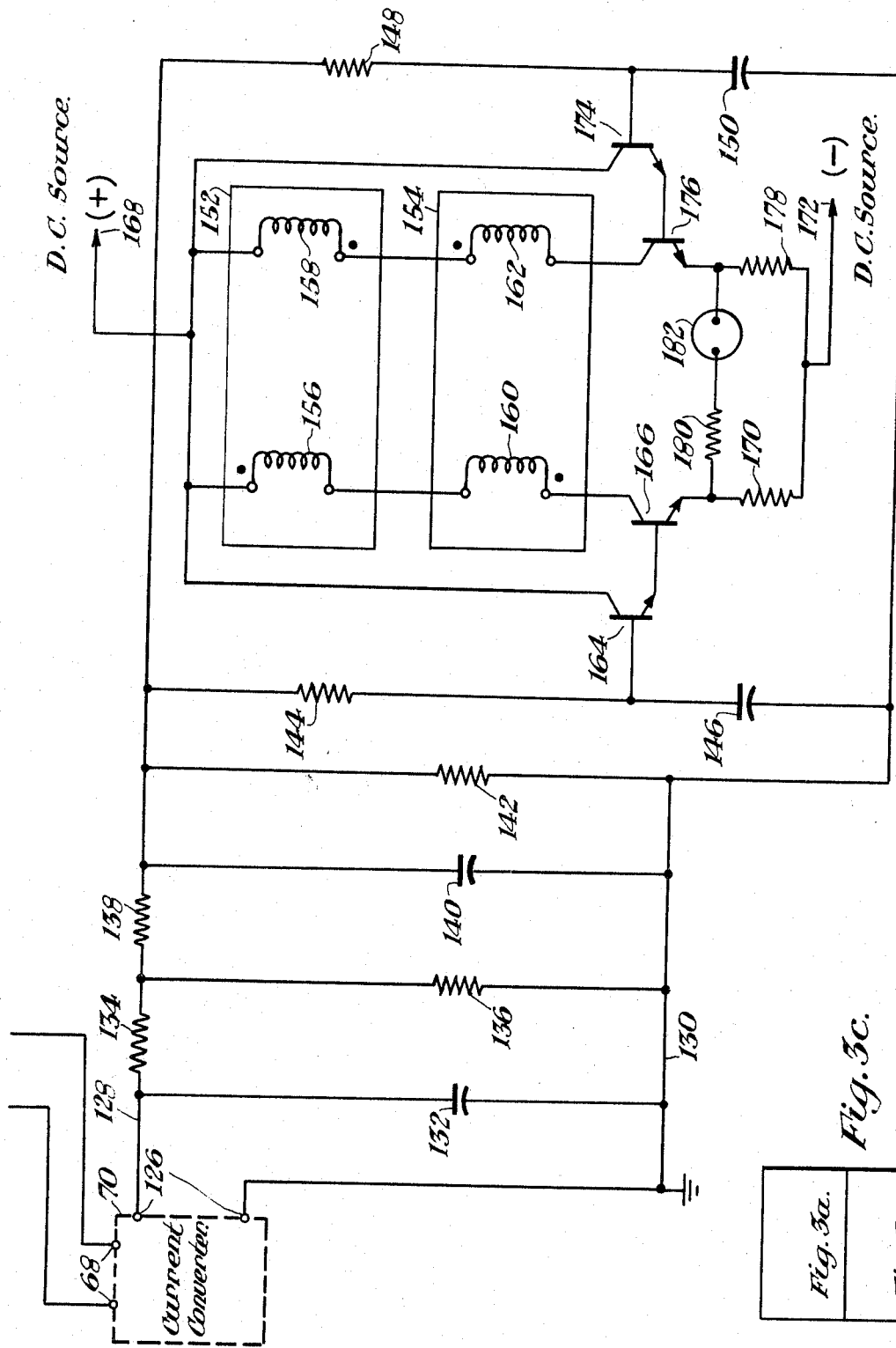

United States Patent Office 3,432,604
Patented Mar. 11, 1969

3,432,604
AUTOMATIC DETERMINATION OF ARC
FURNACE OPERATING STATE
Samuel S. Harbaugh, Natrona Heights, Pa., assignor to
Allegheny Ludlum Steel Corporation, Brackenridge,
Pa., a corporation of Pennsylvania
Filed Feb. 13, 1967, Ser. No. 615,789
U.S. Cl. 13—13
Int. Cl. H05b 7/18
6 Claims

ABSTRACT OF THE DISCLOSURE

An apparatus for determining the operating state of an electric arc furnace wherein each of four bistable units is energized in response to a change in condition of the operating state to wit: arc power increase, arc power decrease, arc current increase, and arc current decrease. Each of the bistable units has a relay connected to the output thereof, the actuation of one or more relays energizing means to provide an indication of the operating state of the furnace on its curve of arc melting power vs. arc current.

Background of the invention

The power characteristics of a 3-phase electric arc furnace are such that as the current increases, the arc power increases up to a maximum point, and subsequently, with an increase in arc current, the arc power decreases. This condition permits the operation of the electric arc furnace at two values of arc current for a particular value of arc power. It is desirable in controlling the electrodes to know exactly at what point the furnace is operating. Under ordinary circumstances, it is preferred that an increase in arc current produce a corresponding increase in arc power up to the point of maximum arc power. Operating beyond this region results in lower efficiency and wasted power with a corresponding economic waste. However, in some melting practices it may be desirable to operate at any point on the curve of arc melting power versus current. The basic problem heretofore has been to determine the operating point to effectively utilize this determination to control the position of the electrodes. The subject matter of this invention can be utilized, for example, in the system of U.S. application, Ser. No. 535,073, entitled "Electrode Control for Arc Furnace" by Harold S. Jackson and assigned to the assignee of the instant application.

Accordingly, it is an object of this invention to provide a new and improved system for determining the operating point of an arc furnace.

It is a further object of this invention to provide a new and improved system, with provisions for determining the operating point of the furnace on a curve of arc melting power versus arc current without the necessity of knowing the actual furnace parameters.

It is another object of this invention to provide a new and improved system for determining the operating state of an arc furnace wherein time derivatives of arc power and arc current are generated.

It is a still further object of this invention to provide a new and improved system wherein time derivatives of arc power and arc current are utilized to determine whether arc power increases or decreases when arc current increases or decreases.

Still another object of this invention is to provide a new and improved system for automatic determination of the arc furnace operating state utilizing the aforesaid time derivatives to energize bistable units.

Summary of the invention

Briefly, the present invention accomplishes the above cited objects by providing means for generating a first or a second signal indicative of the increasing or decreasing nature of the time derivative of power and a third or a fourth signal indicative of the increasing or decreasing nature of the time derivative of current, means for comparing the coexistence of one or more of these signals, and means for determining the operating point by comparison of the existing signals. Where the power measurement equipment has an inherent time delay, time delay means are also provided in the current time derivative circuit to simulate the time delays in the power circuit so that the electrical signals to the two time derivative circuits are in phase.

Brief description of the drawings

Further objects, features and advantages of the invention will become apparent from the following description when taken in conjunction with the accompanying drawings in which:

FIGS. 3a and 3b are schematic diagrams of the time derivative circuits according to the invention when assembled in the manner shown in FIG. 3c;

FIG. 4 is a schematic diagram of the decoding matrix associated with FIGS. 3 and 3a.

Description of the preferred embodiment

Figure 1:
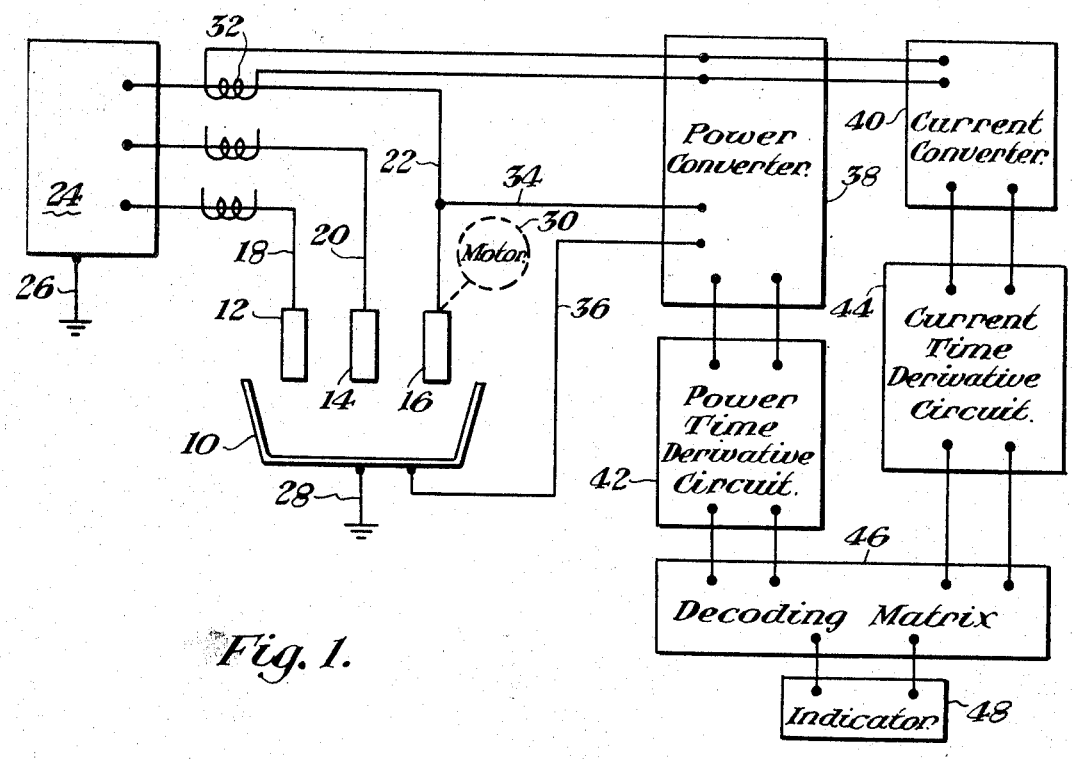
FIGURE 1 is a diagrammatic illustration of the invention.

Referring now to the drawings, there is shown in FIG. 1 a furnace 10 having suspended therein three electrodes 12, 14 and 16, each of which is electrically connected to a 3-phase transformer power source 24 through the respective conductors 18, 20 and 22, with the power source grounded by lead 26, as is furnace 10 by lead 28. An individual drive motor 30 (only one of which is shown) is provided for each electrode and mechanically coupled thereto for driving the electrode.

Inasmuch as the electrical circuitry for each phase, and consequently each electrode, is identical, FIG. 1 shows the circuitry for one electrode only, to wit: electrode 16. To obtain a current signal, a current transformer 32 is inductively coupled to the conductor 22 of the electrode 16. In order to obtain a voltage signal proportional to the arc voltage, a lead 34 is electrically connected to conductor 22 in close proximity to electrode 16, and a second lead 36 acting as a neutral voltage pickup is suitably electrically connected to the furnace 10.

Two converters are provided for utilization of the arc current signal and arc voltage signal, a power converter 38 for measurement of the arc power, and a current transducer or converter 40 for providing a signal proportional to arc current.

The output of the power converter is fed into a suitable power time derivative circuit 42, and the output of the current converter is fed into a current timer derivative circuit 44. The power time derivative circuit 42 provides a first signal or a second signal, depending upon the condition of the arc power in a particular time period, that is, whether the power is increasing or decreasing. Similarly, the current time derivative circuit 44 provides an output signal of one polarity or the other, depending upon an increase or decrease in arc current for a given time period. If no change occurs in either time derivative circuit, there is no output. The outputs from the time derivative circuits 42 and 44 are compared in a decoding matrix 46 to provide an indication of the arc furnace operating state at indicator 48. If the signals from both time derivative circuits are of the same polarity, then it is determined that the furnace is operating in the region designated HPF (high power factor) in FIG. 2. If the current time derivative is of a certain magnitude and the power time derivative is near zero, then it is determined that operation is near the maximum power point (MP in FIG. 2). If the signals are of opposite polarity, then operation is in the low power factor (LPF) region of FIG. 2. As indicated by point 52 on curve 50 in FIG. 2, if the current time derivative is near zero, then no determination can be made as to the operating point.

Figure 2:
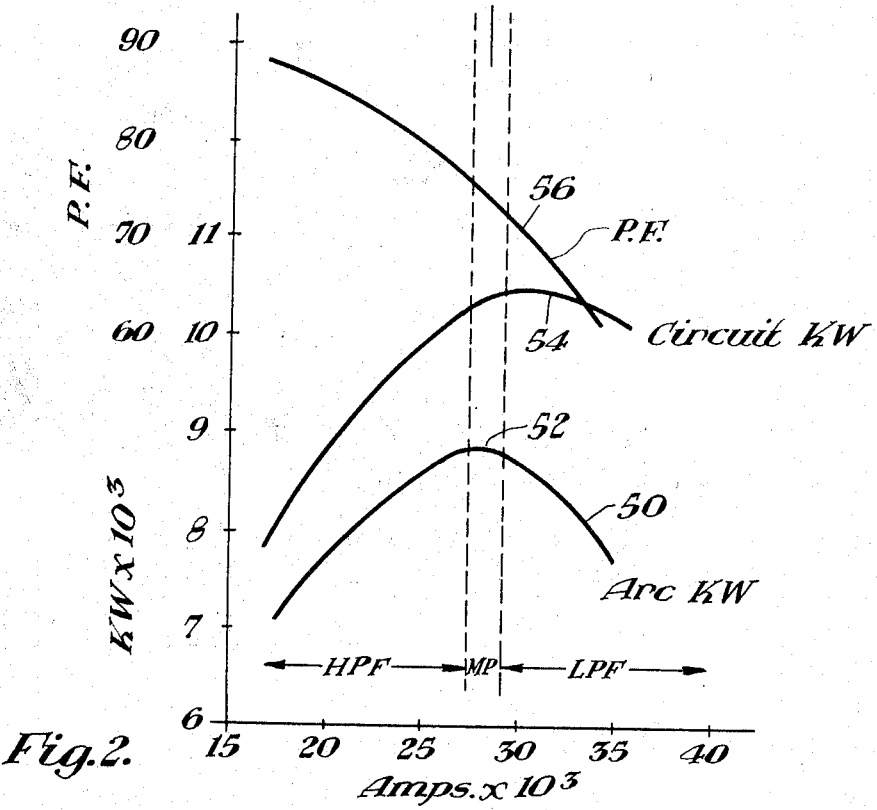
FIG. 2 is a graphical illustration of the electrical characteristics of a typical electric arc furnace.

FIG. 2 shows the graphical relation and the electrical operating characteristics of a typical arc furnace with the current shown on the horizontal axis and the power factor on the verical axis. A curve 50 illustrates the arc power with respect to the arc current. Curve 54 represents the power input into the furnace with respect to arc current, while curve 56 represents the power factor change with respect to current.

*Description of the circuit*

Figure 3D:
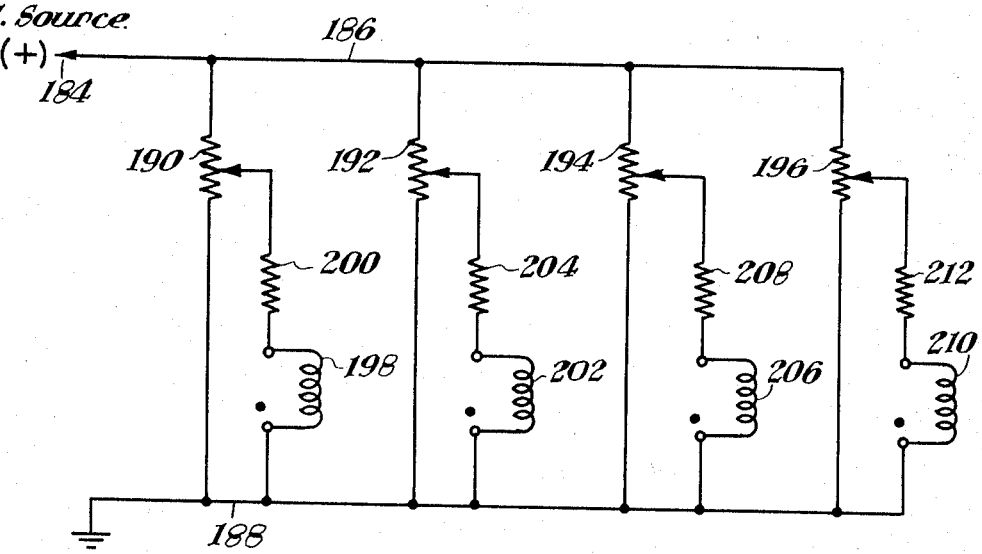
FIG. 3d shows schematically the bias windings for the bistable units of FIGS. 3a and 3b.

The schematic circuit is shown in FIGS. 3a, 3b and 3d, and corresponds to the diagrammatic illustration FIG. 1. The power converter 38 in FIG. 1 is represented by a thermal converter 58 and the power recorder 60. The thermal converter 58 receives a signal proportional to arc voltage from transformer 62 which provides the arc voltage input at terminals 64 of thermal converter 58. An arc current signal from current transformer 32 is applied to terminals 66 of the thermal converter 58. This current signal is also applied to a current converter 70 at terminals 68 thereof. The output signal from thermal converter 58 is proportional to the arc melting power of electrode 16 of the furnace 10, and this power signal is applied to the power recorder 60 at terminals 72 thereof. The power recorder 60 includes a slide wire resistor 74 which has a movable tap 76, the tap 76 being actuated in accordance with the input power signal terminal 72. Opposite ends of the slide wire rheostat are connected to terminals 78 and 80, while the movable tap 76 is connected to terminal 82. The terminal 80 is connected to ground, while terminal 78 is connected to current limiting resistor 84 to a positive supply of DC voltage 86. Connected between terminal 82 and ground is a series circuit including resistor 88 and capacitor 90. Also connected in parallel with the RC circuit so formed is a second RC circuit including ҙsistor 92 and capacitor 94. Capacitors 90 and 94 are of the same value; while resistor 92 is approximately twice the resistance of resistor 88, it is not intended that this be limiting, the main requirement being that the time constant for one RC circuit be different from the time constant of the other RC circuit for reasons which will hereinafter become obvious.

A pair of bistable units 96 and 98 are provided, each being substantially identical in construction and operation. The bistable unit 96 has a first control winding 100 and a second identical control winding 102. Similarly the bistable unit 98 has identical control windings 104 and 106. Control windings 100 and 104 of bistable units 96 and 98, respectively, are connected in series-opposing relationship, and similarly, control windings 102 and 106 are connected in series-opposing relationship.

A transistor 108 has the base thereof electrically connected to a point intermediate resistor 88 and capacitor 90. The collector of transistor 108 is connected to the DC power source 86, while the emitter thereof is connected to the base of a second transistor 110. The series circuit formed by control winding 100 and 104 is electrically connected between the collector of transistor 110 and DC source 86. The emitter of transistor 110 is connected through resistor 112 to a negative DC power source 114.

A third transistor 116 has the base thereof electrically connected to a point intermediate resistor 92 and capacitor 94. The collector of transistor 116 is connected to the DC source 86, while the emitter thereof is connected to a fourth transistor 118. The series circuit, including control windings 102 and 106 of bistable unit 96 and 98, is connected between the DC source 86 and the collector of transistor 118. The emitter of transistor 118 is connected through resistor 120 to the negative DC source 114. Additionally, the emitter of transistor 118 is connected through resistor 122 to the emitter of transistor 110. A zero-center microammeter 124 and resistor 122 may also be provided to detect any unbalance in the circuit.

It should also be noted that control winding 100 has its total ampere-turns opposing the ampere-turns of control winding 102 of the same bistable unit 96. Similarly, control winding 104 has its ampere-turns in opposition to the ampere-turns of control winding 106 of bistable unit 98. The transistors 108, 110, 116 and 118 are of the NPN variety.

A second time derivative circuit is provided for the arc current as sensed by the current converter 70. One of the output terminals 126 of current converter 70 is tied directly to ground, while the other end is connected to a lead 128. A lead 130 is connected to the ground, and a capacitor 132 is connected between leads 128 and 130. Resistors 134 and 136 are connected in series between leads 128 and 130. Electrically connected to the point intermediate resistors 134 and 136 is one end of a resistor 138, the other end of resistor 138 being connected through a capacitor 140 to ground lead 130. A resistor 142 is connected in parallel with capacitor 140.

The resistors 134, 136, 138 and 142, along with capacitors 132 and 140, form a time delay circuit, the purpose of which will become obvious. Connected in parallel with resistor 142 is a series circuit including resistor 144 and capacitor 146. Also connected in parallel with the RC circuit so-formed is a second RC circuit, including resistor 148 and capacitor 150. Capacitors 146 and 150 are of the same value, while resistor 148 is approximately twice the resistance of resistor 144. As previously stated in connection with the first time derivative circuit, the main requirement is that the time constant for one RC circuit be different from the time constant for the other RC circuit.

A second pair of bistable units 152 and 154 are provided, each being substantially identical in construction and operation. The bistable unit 152 has a first control winding 156 and a second identical control winding 158. Similarly, the bistable unit 154 has identical control windings 160 and 162. Control windings 156 and 168 of bistable units 152 and 154, respectively, are connected in series opposing relationship, and similarly, control windings 158 and 162 are connected in series opposing relationship.

Transistor 164 has the base thereof electrically connected to a point intermediate resistor 144 and capacitor 146. The collector of transistor 164 is connected to a DC power source 168, while the emitter thereof is connected to the base of a second transistor 166. The series circuit formed by control windings 156 and 160 is electrically connected between the collector of transistor 166 and DC source 168. The emitter of transistor 166 is connected through resistor 170 to a negative DC power source 172.

A third transistor 174 has the base thereof electrically connected to a point intermediate resistor 148 and capacitor 150. The collector of transistor 174 is connected to the DC source 168, while the emitter thereof is connected to a fourth transistor 176. The series circuit formed by control windings 158 and 162 is connected between DC source 168 and the collector of transistor 176. The emitter of transistor 176 is connected through resistor 178 to the negative DC source 172. Additionally, the emitter of transistor 176 is connected through resistor 180 to the emitter of transistor 166. A zero center microammeter 182 and resistor 180 may also be provided to detect any unbalance in the circuit.

It should also be noted that control winding 156 has its total ampere-turns opposing the ampere-turns of control winding 158 of the same bistable unit 152. Similarly, control winding 160 has its ampere-turns opposing the ampere-turns of control winding 162 of bistable unit 154. The transistors 164, 166, 174 and 176 are of the NPN variety.

FIG. 3a shows a DC source 184 connected to lead 186 and a ground lead 188. Connected between leads 186 and 188 are resistors 190, 192, 194 and 196. Each of these resistors has a movable tap and serves as a voltage divider. For example, the movable tap of resistor 190 is connected through current limiting resistor 200 and through a control winding 198 to ground lead 188. Similarly, control winding 202 and resistor 204 are connected in series; control winding 206 and resistor 208 are connected in series; and control winding 210 and current limiting resistor 212 are connected in series. Each of the control windings establishes an operating point for the particular bistable unit with which it is associated; for example, control winding 198 is utilized with bistable unit 96; control winding 202 is utilized with bistable unit 98; control winding 206 is utilized with bistable unit 152; and control winding 210 is utilized with bistable unit 154.

Circuit operation

Briefly, the present invention provides a means for generating a signal proportional in magnitude to the arc melting power and a second means for generating a signal proportional in magnitude to the arc current. The power signal means includes the thermal converter 58 and the power recorder 60, while the current signal means includes the current converter 70. With the power at a particular level, a signal exists which is proportional to the power level at that time. This signal appears at the base of transistor 116, and during a steady state condition the same signal exists at the base of transistor 108, both signals being represented by a steady state voltage. With an increase in power, the movable tap 76 of slide wire resistor 74 within the recorder 60 moves upward as indicated by the arrow. This immediately increases the voltage at terminal 82 of power recorder 60, inasmuch as the slide wire resistor 74 acts as a voltage divider in series with the current limiting resistor 84. The current-limiting resistor 84 serves to prevent the direct coupling of the respective RC circuits to the DC source. As the voltage at terminal 82 increases, the voltage levels at the bases of transistors 116 and 108 will increase correspondingly. However, due to the value of resistors of the RC circuits, the voltage at the base of transistor 116 will increase more slowly than the voltage appearing at the base of transistors 108. Accordingly, it can be said that the voltage at the base of transistor 116 represents a long-time average power, whereas the voltage at the base of transistor 108 will detect any short-term increases or decreases in the power level as indicated by power recorder 60.

During operation of this time derivative circuit, the transistors 108, 110, 116 and 118 are in the conductive state and the primary purpose of the emitter-follower configurations is to provide impedance buffering so current is not drawn from the capacitors 90 and 94. The transistors additionally serve to provide current amplification so that minute power changes are detected in large current amplifications for the purpose of energizing the control windings in the collector circuits of transistors 110 and 118.

During a steady state condition due to the symmetrical nature of the time derivative circuit, the current flow through the control windings in the collector circuit of transistor 110 will be identical to the current flow through the control windings in the collector circuit of transistor 118. Consequently, the ampere-turns of the opposite control windings 100 and 102, for example, in bistable unit 96 will be in opposing relationship and the bistable unit 96 will be in an "off" state. This is also true of bistable unit 98.

With the increase in power previously mentioned, the collector circuit of transistor 110 will conduct more current than the collector circuit of transistor 118, thereby providing more ampere-turns in control winding 100 of bistable unit 96 to an "on" state. Inasmuch as the same current will flow through control winding 104 of bistable unit 98 with this control winding opposing control winding 100 of bistable unit 96, the net effect of the ampere-turns in control winding 104 will drive bistable unit 98 further into the "off" state. Thus it can be seen that bistable unit 96 can be defined as the power increase bistable unit. After a given time period, depending upon the relative time constants of the two RC circuits, the voltages at the bases of transistors 108 and 116 will again equalize to restore bistable unit 96 to its "off" state.

With a decrease in power, the movable tap 76 moves toward ground potential. Consequently, with the stored charges in capacitors 90 and 94 resulting in a voltage in excess of the voltage existing at terminal 82 of power recorder 60, the capacitors 90 and 94 then begin to discharge through their respective resistors. When this occurs, capacitor 94 will discharge more slowly than capacitor 90, thereby keeping the voltage at the base of transistor 116 at a higher level than the voltage at the base of transistor 108. During this time the collector circuit of transistor 118, along with the corresponding control windings 102 and 106 is drawing more current than the collector circuit of transistor 110. This results in the ampere-turns of control winding 106 being in excess of the ampere-turns of control winding 104 of bistable unit 98. This therefore energizes bistable unit 98 to its "on" position to denote a power decrease situation. Similarly, control winding 102 drives bistable unit 96 further into the "off" state. The emitters of transistors 110 and 118 are connected through resistors 112 and 120, respectively, to a negative DC source to insure that the bases of transistors 108 and 116 remain at some value of voltage which is positive with respect to the emitters to keep the transistors conducting regardless of the power indication at power recorder 60.

Inasmuch as the current time derivative circuit is essentially similar in operation to that discussed in connection with the power time derivative circuit, a detailed discussion thereof is not deemed necessary. Suffice to say that the base of transistor 174 can be set to represent a long-time average current, while the base of transistor 164 will detect any increases or decreases in current to energize bistable unit 152 upon an increase in current, and energize bistable unit 154 upon a decrease in current. In order to insure that the two time derivative circuits are looking to the power and current at the same time, a time delay means is incorporated in the current time derivative circuit. This time delay means includes capacitors 132 and 140 and resistors 134, 136, 138 and 142. The particular time delay period is so chosen to simulate the time delay which ordinarily occurs in the thermal converter 58 which measures the power according to heating units located therein.

The bistable units 96, 98, 152 and 154, when energized, energize the corresponding relay coils $P_i$, $P_d$, $I_i$, $I_d$ respectively, (shown in FIG. 4) the capital letters of the designations referring to power (P) and current (I), and the subscripts referring to increase or decrease, respectively. Three indicating units 214, 216 and 218 are provided and are adapted to be energized from suitable power source 220 upon the happening of certain conditions. Referring to FIG. 2, it can be seen that in the region designated HPF, with an increase in current an increase in power results, and correspondingly, power and current decrease simultaneously. Indicator 214, designated HPF, has one end thereof connected to one power lead 222, while the circuit to the other power lead 224 can be completed through one of two parallel paths. The first path includes relay contacts $P_i$ in series with relay contacts $I_i$, while the second path includes relay contacts $P_d$ in series with relay contacts $I_i$. Both sets of contacts are shown in a normally opened position. Consequently, it can be seen that with an increase in power represented by the energization of bistable unit 96, and an increase in current represented by the energization of bistable unit 152, the outputs of these bistable units will energize relay coils $P_i$ and $I_i$, respectively, to close the contacts thereof and thereby complete a path to indicating unit 214. Similar decreases in power and current will result in the closing of relay contacts $P_d$ and $I_d$ to energize the alternate power to indicating unit 214.

With the arc furnace operating in the zone designated MP, the furnace will be operating at maximum power. At this point the power bistable units 96 and 98 will be in their quiescent states within the range preset by the biasing circuits of FIG. 3d. The indicating unit 216 has one end thereof connected to power lead 222 and the other end thereof connected through normally closed relay contacts $P_d$ through normally closed relay contacts $P_i$, and alternatively through normally opened relay contacts $I_i$ or normally opened relay contacts $I_d$ to the other power lead 224. With such a configuration, an increase or decrease in current without a corresponding change in power will energize either bistable unit 152 or bistable unit 154 to close relay contacts $I_d$ or $I_i$, respectively, to thereby energize indicating unit 216. As can be appreciated, if the power changes in any way, one of the normally closed power relay contacts will open to break the circuit.

In the region designated LPF in FIG. 2, it can readily be seen that an increase in current will result in a decrease in power, and vice versa. Indicating unit 218 is connected to show this condition of low power factor. Indicating unit 218 has one end thereof connected to power lead 222, while the other end thereof is alternatively connected through normally opened relay contacts $I_i$ through normally opened relay contacts $P_d$ to the other power lead 224 or through normally opened relay contacts $I_d$ through normally opened relay contacts $P_i$ to the power lead 224. With an increase in power followed by a corresponding decrease in current, bistable units 96 and 154 will be energized to thereby actuate the corresponding relay coils $P_i$ and $I_d$ to complete one power of energization for indicating unit 218. Conversely, with a decrease in power and an increase in current, bistable units 98 and 152 will be energized to actuate the corresponding relay coils $P_d$ and $I_i$ to close the corresponding contacts and energize the alternate path for indicating unit 218.

Figure 4:
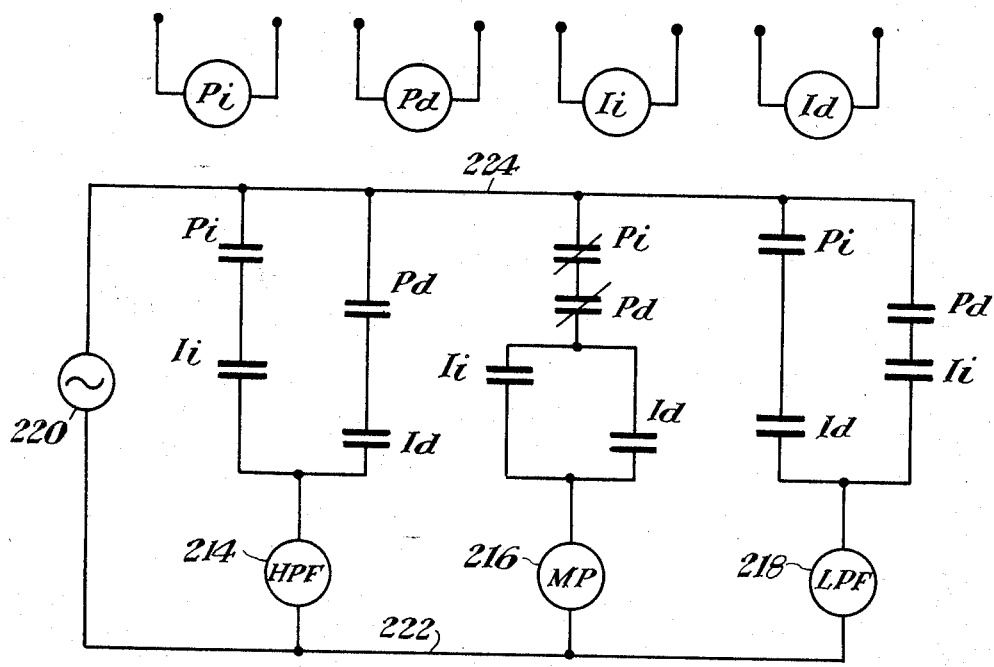

Thus it can be seen that the present invention provides a means for determining the arc furnace operating state within a specified range without the necessity of knowing the actual parameters of a given furnace, and the output of the decoding matrix of FIG. 4 can be utilized to provide an indication or can also be utilized to control the position of the electrode.

While there has been shown and described a preferred embodiment, it is to be understood that various other adaptations and modifications may be made without departing from the scope and spirit of the invention.

I claim:
1. In a system for determining the operating state of an electric arc furnace of the type which has the operating characteristic that as the arc current increases the arc melting power increases to a maximum at a given value of arc current and thereafter the arc melting power decreases, said system comprising:
 (a) first means for producing a signal proportional in magnitude to the arc power;
 (b) second means for producing a signal proportional in magnitude to the arc current;
 (c) power time derivative means responsive to said first means for producing one of two mutually exclusive signals according to the increasing or decreasing nature of the power;
 (d) current time derivative means responsive to said second means for providing one of two mutually exclusive signals according to the increasing or decreasing nature of the arc current; and
 (e) other means for comparing signals from said power time derivative means and said current time derivative means to produce an indication of the operating point of said arc furnace.

2. The combination of claim 1 wherein a device is included in one of said first and second means for delaying a signal passing therethrough and time delay means are included in the other of said first and second means to provide in-phase signals to both time derivative means.

3. The combination of claim 2 wherein said device is included in said first means and said time delay means are included within said second means.

4. The combination of claim 1 wherein said power time derivative means and said current time derivative means each includes bistable means.

5. The combination of claim 4 wherein said bistable means includes a first or a second relay energized in response to the increasing or decreasing nature of the input signal thereto.

6. A system for determining the operating state of an electric arc furnace of the type which has the operating characteristic that as the arc current increases the arc melting power increases to a maximum at a given value of arc current and thereafter the arc melting power decreases, said system comprising:
 (a) first means for producing a signal in response to an increasing time derivative of power;
 (b) second means for producing a signal responsive to a decreasing time derivative of power;
 (c) third means for producing a signal responsive to an increasing time derivative of current;
 (d) fourth means for producing a signal responsive to a decreasing time derivative of current, and
 (e) other means responsive to at least one signal from said first, second, third and fourth means for producing an indication of the operating point of said arc furnace.

References Cited

UNITED STATES PATENTS 3,209,060    9/1965    Borrebach _____ 13—13
3,277,229    10/1966    Oppenheim _____ 13—13
3,364,295    1/1968    Roberts _____ 13—13

BERNARD A. GILHEANY, *Primary Examiner.*

R. N. ENVALL, JR., *Assistant Examiner.*